United States Patent [19]
Gravier et al.

[11] Patent Number: 5,847,180
[45] Date of Patent: Dec. 8, 1998

[54] NEUTRALIZATION METHOD FOR POLYORGANOSILOXANES

[75] Inventors: Daniel Gravier; Arthur James Tselepis, both of Midland, Mich.

[73] Assignee: Dow Corning Corporation, Midland, Mich.

[21] Appl. No.: 990,417

[22] Filed: Dec. 15, 1997

[51] Int. Cl.[6] ........................................................ C07F 7/08
[52] U.S. Cl. ............................................................ 556/466
[58] Field of Search ............................................. 556/466

[56] References Cited

U.S. PATENT DOCUMENTS

| | | | |
|---|---|---|---|
| 4,157,337 | 6/1979 | Evans | 260/448.2 |
| 4,250,290 | 2/1981 | Petersen | 528/14 |
| 5,210,254 | 5/1993 | Ritscher et al. | 556/466 |
| 5,659,056 | 8/1997 | Hergenrother et al. | 556/466 |

Primary Examiner—Paul F. Shaver
Attorney, Agent, or Firm—Melvin D. Fletcher

[57] ABSTRACT

A method for neutralizing a polyorganosiloxane mixture. The method comprises (A) contacting a mixture comprising a polyorganosiloxane and a base with a neutralizing amount of a solid organic acid at a mixture temperature above the melting temperature of the solid organic acid forming a molten organic acid and forming an insoluble adduct of the base with the molten organic acid, (B) lowering the mixture temperature to effect solidification of residual molten organic acid to residual solid organic acid, and (C) effecting separation of the insoluble adduct and the residual solid organic acid from the polyorganosiloxane mixture. The present invention is especially useful for neutralizing mixtures comprising polyorganosiloxane mixtures where the polyorganosiloxane comprises hydrocarbyl groups bonded to silicon.

21 Claims, No Drawings

NEUTRALIZATION METHOD FOR POLYORGANOSILOXANES

BACKGROUND OF INVENTION

The present invention is a method for neutralizing a polyorganosiloxane mixture having contained therein a base. The method comprises contacting the mixture with a neutralizing amount of a solid organic acid at a mixture temperature above the melting point temperature of the solid organic acid to form an insoluble adduct of the base with the molten organic acid, lowering the mixture temperature to effect solidification of residual molten organic acid to residual solid organic acid, and effecting separation of the insoluble adduct and the residual solid organic acid from the polyorganosiloxane mixture by standard means for separating solid-liquid mixtures.

Polyorganosiloxanes are used in the form of fluids and are crosslinked to form, for example, silicone rubbers and resins. It is important that polyorganosiloxane fluids as well as compositions containing such fluids and components prepared therefrom be stable during storage, shipment, and exposure to heat. A typically process for making polyorganosiloxanes involves heating low molecular weight linear polyorganosiloxanes and cyclic polyorganosiloxanes at a temperature above about 100° C. in the presence of a base such as potassium silanolate or potassium hydroxide to effect polymerization of the siloxanes to higher molecular weight polyorganosiloxanes. The product of this base catalyzed reaction is an equilibrium mixture comprising as a major portion linear polyorganosiloxanes and as a minor portion cyclic polyorganosiloxanes. The presence of the cyclic polyorganosiloxanes in products is undesirable because they can have sufficiently high vapor pressure to cause problems during use, and therefore these cyclics are typically removed by heat distillation under reduced pressure. If the base catalyst is not neutralized additional cyclic siloxanes will be generated during the distillation process in an attempt to maintain equilibrium conditions. In addition polyorganosiloxanes and compositions comprising them have impaired heat resistance and storage stability when the base catalyst is not sufficiently neutralized.

Evans, U.S. Pat. No. 4,157,337, teaches polymerization of a first cyclic siloxane with a second cyclic tetrasiloxane in the presence of a catalyst comprising a potassium hydroxide complexed with a cyclic polyether and neutralizing the catalyst in the reaction mixture after equilibrium.

Petersen, U.S. Pat. No. 4,250,290, teaches a polymerization reaction taking place in a static mixer wherein dimethyl cyclic polysiloxane monomers are treated with a potassium silanolate catalyst and neutralized with a silyl phosphate neutralizer.

The present invention provides for a method for neutralizing base present in polyorganosiloxane mixtures by using as neutralizing agent a solid organic acid having a melting point such that the mixture can be contacted with the solid organic acid at a temperature above the melting point of the solid organic acid thereby effecting neutralization in a homogeneous process containing only liquid reactants. The temperature of the mixture is then lowered below the melting point temperature of the molten organic acid thereby effecting solidification of the residual molten organic acid. Residual solid organic acid and the insoluble adduct formed as the neutralization product can then be easily separated from the mixture by standard method for separating solid-liquid mixtures. Because the present neutralization method is run as a homogeneous liquid-phase process, neutralization of the base can be effected quickly without the use of large stoichiometric excesses of the solid organic acid. Separation of residual solid organic acid and the insoluble adduct neutralization product from the polyorganosiloxane mixture is readily achieved by cooling the mixture below the melting point of the solid organic acid to effect solidification and using standard methods such as filtration to effect separation of the resulting solid-liquid mixture.

SUMMARY OF INVENTION

The present invention is a method for neutralizing a polyorganosiloxane mixture. The method comprises (A) contacting a mixture comprising a polyorganosiloxane and a base with a neutralizing amount of a solid organic acid at a mixture temperature above the melting temperature of the solid organic acid forming a molten organic acid and forming an insoluble adduct of the base with the molten organic acid, (B) lowering the mixture temperature to effect solidification of residual molten organic acid to residual solid organic acid, and (C) effecting separation of the insoluble adduct and the residual solid organic acid from the polyorganosiloxane mixture. The present invention is especially useful for neutralizing mixtures comprising polyorganosiloxane mixtures where the polyorganosiloxane comprises a hydrocarbyl group bonded to silicon.

DESCRIPTION OF INVENTION

The present invention is a method for neutralizing a polyorganosiloxane mixture. The method comprises (A) contacting a polyorganosiloxane mixture comprising a polyorganosiloxane and a base with a neutralizing amount of a solid organic acid at a mixture temperature above the melting point temperature of the solid organic acid forming a molten organic acid and forming an insoluble adduct of the base with the molten organic acid, (B) lowering the mixture temperature to effect solidification of residual molten organic acid to residual solid organic acid, and (C) effecting separation of the insoluble adduct and the residual solid organic acid from the polyorganosiloxane mixture.

The polyorganosiloxane component of the present mixture can be any of those known in the art. Generally, the polyorganosiloxane can comprise repeating units described by formula —$(R^1{}_2SiO)_x$—, where each $R^1$ can be independently selected from the group comprising hydrocarbyl groups comprising less than about 12 carbon atoms. The hydrocarbyl group can be, for example, an alkyl such as methyl, ethyl, propyl, and tert-butyl; an aryl such as phenyl; an alkenyl such as vinyl, allyl, and hexenyl; a cycloalkyl such as cyclopentyl and cyclohexyl; a substituted alkyl such as 3,3,3-trifluoropropyl and chloromethyl; and a substituted aryl such as chlorophenyl. The number of repeating units denoted by x is not limited and can be from about two to 100,000 or greater. The polyorganosiloxane can be a linear or branched polymer. The polydiorganosiloxane can be monodisperse or polydisperse. The polydiorganosiloxane can be a homopolymer or a block or random copolymer. The polyorganosiloxane may be end-terminated, for example, with siloxy groups described by formula $R^1{}_2R^2{}_1SiO$—, where $R^1$ is as previously described and $R^2$ is selected from the group consisting of $R^1$ and hydroxyl. The polydiorganosiloxane can be, for example, trimethylsiloxy end-terminated polydimethylsiloxane, vinyldimethylsiloxy end-terminated polydimethylsiloxane, vinyldimethylsiloxy end-terminated polydimethyl(vinylmethyl)siloxane copolymer, dimethylhydroxysiloxy end-terminated polydimethylsiloxane, trimethylsiloxy or (3,3,3- trifluoropropyl)dimethylsiloxy end-terminated polydiorganosiloxane having about 50 percent of pendant organic groups attached to silicon being methyl and the remainder being 3,3,3-trifluoropropyl, and trimethylsiloxy end-terminated polydimethyl(methylphenyl)siloxane copolymer.

The present method is particularly useful for neutralizing mixtures where the polyorganosiloxane comprises one or more hydrocarbyl groups bonded to silicon. It is well known that strong acids can at high temperatures cleave the Si—C bonds, particularly in silicone aryl linkages. Therefore, processes for preparing polyorganosiloxanes having an aromatic bonded to silicon atoms are typically prepared using a base catalyst and the catalyst is then neutralized with a weak acid. To prevent scission of the Si—C bond during storage and when using polyorganoarylsiloxane, it is necessary to neutralize the base catalyst in a manner such that residual acid is not left in the polyorganoarylsiloxane. The present method offers an effective and convenient method for accomplishing this neutralization.

In a preferred method, the polyorganosiloxane mixture results from the polymerization of cyclic or short-chain polyorganosiloxanes, and mixtures thereof, in the presence of a base. Such a mixture can be made by polymerizing cyclic polyorganosiloxanes having on the average from three to six organosiloxy units per molecule in the presence of short-chain linear polyorganosiloxanes useful as chain extenders and as endblockers. A preferred polyorganosiloxane mixture for use in the present method results from the potassium silanolate catalyzed polymerization of a mixture comprising linear and cyclic polydimethylsiloxanes, cyclic vinylmethylsiloxanes and a hexamethyldisiloxane endblocker.

In the preferred polyorganosiloxane mixture for use in the present method the polyorganosiloxane is a trimethylsiloxy or vinyldimethylsiloxy end-terminated.

The base comprising a portion of the polyorganosiloxane mixture is not critical to the present method as long as the base can form an insoluble adduct with the solid organic acid when heated. In a preferred method the base present in the polyorganosiloxane mixture is an alkali metal hydroxide or alkali metal silanolate. Most preferred is when the base is potassium silanolate or potassium hydroxide. The concentration of the base in the polyorganosiloxane mixture is not critical and can generally be those concentrations useful in catalyzing the polymerization of polyorganosiloxane mixture, for example up to about 1,000 ppm.

The solid organic acid useful in the present method can be any material which has a melting point temperature lower than the temperature at which significant decomposition of the polyorganosiloxane occurs, forms an insoluble adduct with the base to be neutralized through an acid-base reaction while in the molten state, and can be solidified by lowering the temperature of the neutralized mixture to allow separation from the mixture by methods for separating solid-liquid mixtures. It is preferred that the solid organic acid have a melting point temperature above about 20° C. Even more preferred is when the solid organic acid has a melting point temperature within a range of about 20° C. to 180° C. Most preferred is when the solid organic acid has a melting point temperature within a range of about 35° C. to 150° C.

The chemical nature of the insoluble adduct of the solid organic acid with the base is not critical as long as the insoluble adduct is sufficiently insoluble under the condition of the method to allow separation from the polyorganosiloxane mixture as a solid. The insoluble adduct may be, for example, a compound, salt, or complex resulting from the contact of the base with the solid organic acid in the molten state.

By the term "neutralizing amount" of a solid organic acid, it is meant any amount capable of neutralizing all or a portion of the base present in the polyorganosiloxane mixture through an acid-base reaction thereby forming an insoluble adduct with the base. Since in the present method the polyorganosiloxane mixture has a temperature above the melting point of the solid organic acid, the method is run as a homogeneous liquid phase process thereby effecting very efficient contact of the organic acid with the base and therefore large excesses of the solid organic acid are not required. To ensure optimal neutralization of the base it is preferred that the solid organic acid be added to the present method in at least stoichiometric equivalence relative to the base. Preferred is when about 1 to 2 stoichiometric equivalents of solid organic acid is added relative to the base. Most preferred is when a stoichiometric amount of the solid organic acid is added to the present method relative to the base.

The solid organic acid can be, for example, selected from the group consisting of acids such as undecanoic acid, decanoic acid, lauric acid, 3,4-difluorophenyl lacetic acid, palmitic acid, stearic anhydride, crotonic acid, a mixture of undecanoic acid, dodecanoic acid and sebacic acid, glutaric acid, 2,6-difluorophenyl lacetic acid, 2-acetylbenzoic acid, 2,4-difluorophenyl lacetic acid, 2,5-difluorophenyl lacetic acid, 1,10-decanedicarboxilic acid, trans-cinnamic acid, sebacic acid, 2,4-hexadienoic acid, diglycolic acid, citric acid, stearic acid, and succinic acid; anhydrides such as lauric anhydride, 3-methylglutaric anhydride, 2-acetoxysuccinic anhydride, glutaric anhydride, octadecenylsuccinic anhydride, itaconic anhydride, diglycolic anhydride, succinic anhydride, and homophtalic anhydride; lactones such as γ-phenyl-γ-butyrolactone, ethylene carbonate, 2-coumaranone, 4-methoxy-2(5H)-furanone, 5-7-dimethoxycoumarin, d-1-isocitric lactone, and 2-5-dihydroxyphenylacetic-γ-lactone; and 1,3-propane sultone and 2-oxazolidone. Preferred solid organic acids for use in the present method are succinic anhydride, glutaric acid, citric acid, sorbic acid, undecanoic acid, and ethylene carbonate. The most preferred solid organic acid is succinic anhydride.

The method of effecting the contact of the polyorganosiloxane mixture with the solid organic acid is not critical to the present invention as long as the temperature of the polyorganosiloxane mixture is above the melting point of the solid organic acid thereby forming a molten organic acid. The solid organic acid can be added to the polyorganosiloxane mixture and the mixture heated to a temperature above the melting point of the solid organic acid or the temperature of the polyorganosiloxane mixture may already be above the melting temperature of the solid organic acid when added. In a preferred method, the solid organic acid is added to a polyorganosiloxane mixture resulting from the base catalyzed polymerization of cyclic and/or linear polyorganosiloxanes at an elevated temperature before cool-down has occurred of the mixture below the melting point temperature of the solid organic acid. To insure efficient contact of the solid organic acid in the molten state with the base it is preferred that sufficient mixing of the polyorganosiloxane mixture with the organic acid be effected to form an essentially homogeneous mixture. The mixing can be achieved by standard methods such as stirring.

The length of time of contact of the solid organic acid in the molten state with the polyorganosiloxane mixture is not critical as long as adequate contact is provided to provide the required level of neutralization. Generally, a contact time within a range of about 1 second to 4 hours is considered useful. More preferred is a contact time within a range of about 5 minutes to 4 hours. Even more preferred is a contact time within a range of about 30 minutes to 3 hours. Longer contact times may be used, but in some instances the insoluble complex of the base with the solid organic acid may hydrate causing the complex to solubilize in the polyorganosiloxane mixture and thereby reduce the neutralization effectiveness of the method.

After the solid organic acid in the molten state has been contacted with the base for the desired amount of time, the mixture temperature is lowered to effect solidification of residual molten organic acid to residual solid organic acid. The method of lowering the temperature is not critical and can be by allowing the mixture to cool to ambient temperature unassisted by external means or by providing external cooling to the wall of the container containing the mixture. It is only necessary that the mixture be cooled sufficiently to effect solidification of the molten organic acid, however cooling to lower temperatures is acceptable if desired.

Separation of the insoluble adduct and the residual solid organic acid from the polyorganosiloxane mixture can be effected by standard methods for separation of solid-liquid mixtures. Separation can be effect by such standard methods as settling, centrifugation, and filtration. Filtration is a preferred method for separating the insoluble adduct and the solid organic acid from the polyorganosiloxane mixture.

The following examples are provided to illustrate the present invention. These examples are not intended to limit the scope of the claims herein.

EXAMPLE 1

The ability of succinic anhydride to neutralize a polydimethylsiloxane fluid was evaluated. The polydimethylsiloxane fluid was prepared by adding to a 1.25 L flask, equipped with a stirrer and temperature controller 50 g of a 2 mPa-s polydimethylsiloxane fluid, 893 g of cyclic polydimethylsiloxanes, and 1.0 g of potassium silanolate. This mixture was heated to 140° C. and allowed to polymerize for 6 hours and then cooled to room temperature. A 13.3 g aliquot of the polydimethylsiloxane fluid was placed in a beaker with 20 ml of an indicator solution and titrated with 0.1N alchoholic HCl indicator. The polydimethylsiloxane fluid was determined to have a base number of 1.30 mg KOH/g.

To the polydimethylsiloxane fluid prepared above, 0.83 g of succinic anhydride (m.p. 119°–120° C.) was added and the mixture heated to 120° C. for 5 minutes to completely melt the succinic anhydride. The mixture was cooled to room temperature and filtered to remove crystalline precipitates. A 10.2 g aliquot of the mixture was placed in a beaker with 20 ml of a bromocreosole purple indicator solution prepared by dissolving bomocreosole purple in absolute ethyl alcohol (0.5 wt %) and then the solution was added to a 1:1 mixture of toluene and n-butyl alcohol at 6 ml/gal. The polydimethylsiloxane determined to be completely neutralized.

EXAMPLE 2

The ability of glutaric acid to neutralize a polydimethylsiloxane fluid was evaluated. To a polydimethylsiloxane fluid prepared as in Example 1, 0.93 g of glutaric acid (m.p. 95°–98° C.) was added and the mixture heated to 100° C. for 5 minutes to completely melt the glutaric acid. The mixture was cooled to room temperature and filtered to remove yellow crystalline precipitates. A 11.9 g aliquot of the mixture was placed in a beaker with 20 ml of a bromocreosole purple indicator solution prepared by dissolving bomocreosole purple in absolute ethyl alcohol (0.5 wt %) and then the solution was added to a 1:1 mixture of toluene and n-butyl alcohol at 6 ml/gal. The polydimethylsiloxane determined to be completely neutralized.

EXAMPLE 3

The ability of citric acid to neutralize a polydimethylsiloxane fluid was evaluated. To a polydimethylsiloxane fluid prepared as in Example 1, 1.07 g of citric acid (m.p. 152°–154° C.) was added and the mixture heated to 160° C. for 15 minutes to completely melt the citric acid. The mixture was cooled to room temperature and filtered to remove crystalline precipitates. A 6.0 g aliquot of the mixture was placed in a beaker with 20 ml of a bromocreosole purple indicator solution prepared by dissolving bomocreosole purple in absolute ethyl alcohol (0.5 wt %) and then the solution was added to a 1:1 mixture of toluene and n-butyl alcohol at 6 ml/gal. The polydimethylsiloxane determined to be completely neutralized.

EXAMPLE 4

The ability of 2,4-hexadienoic acid to neutralize a polydimethylsiloxane fluid was evaluated. To a polydimethylsiloxane fluid prepared as in Example 1,1.04 g of 2,4-hexadienoic acid (m.p. 135°–137° C.) was added and the mixture heated to 140° C. for 10 minutes to completely melt the 2,4-hexadienoic acid. The mixture was cooled to room temperature and filtered to remove crystalline precipitates. A 10.87 g aliquot of the mixture was placed in a beaker with 20 ml of a bromocreosole purple indicator solution prepared by dissolving bomocreosole purple in absolute ethyl alcohol (0.5 wt %) and then the solution was added to a 1:1 mixture of toluene and nbutyl alcohol at 6 ml/gal. The polydimethylsiloxane determined to be completely neutralized.

EXAMPLE 5

The ability of undecanoic acid to neutralize a polydimethylsiloxane fluid was evaluated. To a polydimethylsiloxane fluid prepared as in Example 1, 1.01 g of undecanoic acid (m.p. 28.5° C.) was added and the mixture heated to 50° C. for 5 minutes to completely melt the undecanoic acid. The mixture was cooled to room temperature and filtered to remove crystalline precipitates. A 8.79 g aliquot of the mixture was placed in a beaker with 20 ml of a bromocreosole purple indicator solution prepared by dissolving bomocreosole purple in absolute ethyl alcohol (0.5 wt %) and then the solution was added to a 1:1 mixture of toluene and n-butyl alcohol at 6 ml/gal. The polydimethylsiloxane determined to be completely neutralized.

EXAMPLE 6

The ability of ethylene carbonate to neutralize a polydimethylsiloxane fluid was evaluated. To a polydimethylsiloxane fluid prepared as in Example 1,1.0 g of ethylene carbonate (m.p. 37°–39° C.) was added and the mixture heated to 40° C. for 5 minutes to completely melt the ethylene carbonate. The mixture was cooled to room temperature and filtered to remove crystalline precipitates. A 8.77 g aliquot of the mixture was placed in a beaker with 20 ml of a bromocreosole purple indicator solution prepared by dissolving bomocreosole purple in absolute ethyl alcohol (0.5 wt %) and then the solution was added to a 1:1 mixture of toluene and n-butyl alcohol at 6 ml/gal. The polydimethylsiloxane determined to be completely neutralized.

We claim:

1. A method for neutralizing a polyorganosiloxane mixture comprising
   (A) contacting a polyorganosiloxane mixture comprising a polyorganosiloxane and a base with a neutralizing amount of a solid organic acid at a mixture temperature above the melting point temperature of the solid organic acid forming a molten organic acid and forming an insoluble adduct of the base with the molten organic acid,
   (B) lowering the mixture temperature to effect solidification of residual molten organic acid to residual solid organic acid,
   (C) effecting separation of the insoluble adduct and the residual solid organic acid from the polyorganosiloxane mixture.

2. A method for forming a neutralized polyorganosiloxane mixture comprising
   (A) contacting an organosiloxane oligomer with a base effective as a polymerization catalyst at a contact temperature greater than about 20° C. to effect formation of a polyorganosiloxane mixture comprising polyorganosiloxane and the base,
   (B) contacting the polyorganosiloxane mixture with a neutralizing amount of a solid organic acid having a melting point temperature less then the contact temperature of step
   (A) thereby forming a molten organic acid and forming an insoluble adduct of the molten organic acid with the base, where the temperature of the polyorganosiloxane mixture is maintained within a range greater than the melting point temperature of the solid organic acid and the contact temperature of step (A),
   (C) lowering the temperature of the polyorganosiloxane mixture to effect solidification of residual molten organic acid to residual solid organic acid, and
   (D) effecting separation of the insoluble adduct and residual solid organic acid from the polyorganosiloxane.

3. A method according to claim 2, where the polyorganosiloxane comprises dimethylsiloxy, methylvinylsiloxy and methylarylsiloxy units.

4. A method according to claim 2, where the solid organic acid is an acid anhydride.

5. A method according to claim 2, where the solid organic acid is a carbonate.

6. A method according to claim 2, where the solid organic acid is a ketone.

7. A method according to claim 2, where the solid organic acid is a carboxylic acid.

8. A method according to claim 2, where the solid organic acid is selected from a group consisting of succinic anhydride, glutaric acid, citric acid, 2,4-hexadienoic acid, undecanoic acid, and ethylene carbonate.

9. A method according to claim 2, where the base is potassium silanolate or potassium hydroxide.

10. A method according to claim 2, where the melting point temperature of the solid organic acid is within a range of about 20° C. to 180° C.

11. A method according to claim 2, where the melting point temperature of the solid organic acid is within a range of about 35° C. to 150° C.

12. A method according to claim 2, where the neutralizing amount of the solid organic acid is about 1 to 2 stoichiometric equivalents relative to the base.

13. A method according to claim 2, where the neutralizing amount of the solid organic acid is about stoichiometric equivalence relative to the base.

14. A method according to claim 1, where the polyorganosiloxane comprises dimethylsiloxy, methylvinylsiloxy, and methylarylsiloxy units.

15. A method according to claim 1, where the solid organic acid is an acid anhydride.

16. A method according to claim 1, where the solid organic acid is a carbonate.

17. A method according to claim 1, where the solid organic acid is a ketone.

18. A method according to claim 1, where the solid organic acid is a carboxylic acid.

19. A method according to claim 1, where the solid organic acid is selected from the group consisting of succinic anhydride, glutaric acid, citric acid, 2,4-hexadienoic acid, undecanoic acid, and ethylene carbonate.

20. A method according to claim 1, where the melting point temperature of the solid organic acid is within a range of about 35° C. to 150° C.

21. A method according to claim 1, where the neutralizing amount of the solid organic acid is about 1 to 2 stoichiometric equivalents relative to the base.

* * * * *